(12) United States Patent
Damjee

(10) Patent No.: US 12,006,027 B2
(45) Date of Patent: Jun. 11, 2024

(54) ACTIVE PROPELLER SYSTEM

(71) Applicant: ideaForge Technology Pvt. Ltd., Navi Mumbai (IN)

(72) Inventor: Amey Damjee, Navi Mumbai (IN)

(73) Assignee: ideaForge Technology Pvt. Ltd., Navi Mumbai (IN)

( * ) Notice: Subject to any disclaimer, the term of this patent is extended or adjusted under 35 U.S.C. 154(b) by 0 days.

(21) Appl. No.: 18/172,370

(22) Filed: Feb. 22, 2023

(65) Prior Publication Data

US 2023/0264839 A1 Aug. 24, 2023

(30) Foreign Application Priority Data

Feb. 22, 2022 (IN) .............................. 202221009465

(51) Int. Cl.
| | |
|---|---|
| *B64C 27/51* | (2006.01) |
| *B64C 27/00* | (2006.01) |
| *B64U 30/20* | (2023.01) |
| *B64U 30/297* | (2023.01) |

(52) U.S. Cl.
CPC ............ *B64C 27/51* (2013.01); *B64C 27/001* (2013.01); *B64U 30/20* (2023.01); *B64U 30/297* (2023.01); *B64C 2027/003* (2013.01)

(58) Field of Classification Search
CPC . B64C 27/001; B64C 27/35; B64C 27/51–52; B64C 2027/002–003; B64U 10/13; B64U 20/20; B64U 20/60; B64U 30/20; B64U 30/29; B64U 30/296; B64U 30/297
See application file for complete search history.

(56) References Cited

U.S. PATENT DOCUMENTS

| | | | | |
|---|---|---|---|---|
| 2,949,254 | A * | 8/1960 | Bauer ...................... | B64C 27/04 244/17.27 |
| 3,880,551 | A * | 4/1975 | Kisovec .................. | B64C 27/33 416/214 R |
| 4,708,591 | A * | 11/1987 | Roman .................... | B64C 27/41 416/102 |
| 10,759,526 | B2 * | 9/2020 | Hu .......................... | F16D 1/112 |
| 10,759,529 | B2 * | 9/2020 | Stucki ................... | B64C 27/635 |
| 10,960,974 | B2 * | 3/2021 | Muren .................... | A63H 27/12 |
| 10,988,242 | B2 * | 4/2021 | Ye ........................... | B64D 35/00 |
| 11,814,161 | B2 * | 11/2023 | Andryukov ........... | B64C 27/001 |

FOREIGN PATENT DOCUMENTS

CN          212373650 U  *  1/2021

* cited by examiner

*Primary Examiner* — Brian P Wolcott
(74) *Attorney, Agent, or Firm* — Harter Secrest & Emery LLP; Michael Nicholas Vranjes

(57) ABSTRACT

An improved propeller system is disclosed, including at least one resilient component configured with a mounting arrangement of a propeller of the propeller system. The resilient component is made of a resilient material that allows the propeller to tilt about a tethering axis under conditions of differential lift force on blades of the propeller under an advancing condition and a retreating condition. The resilient component includes a pair of cutouts for locating inserts made of a rigid material and positioned with a longitudinal axis of the inserts oriented in radial direction. The orientation of the inserts results in a radially oriented line contact between the propeller and the inserts to ensure that tilting of the propeller is about longitudinal axis of the inserts, defining the tethering axis of the propeller system.

5 Claims, 5 Drawing Sheets

ACTIVE PROPELLER SYSTEM

CROSS-REFERENCE TO RELATED APPLICATIONS

This application claims the benefit under 35 U.S.C. § 119(b) of Indian Patent Application No. 202221009465, filed on Feb. 22, 2022, which application is incorporated herein by reference in its entirety.

FIELD

The present disclosure relates to the field of aerial vehicles. In particular, the present disclosure relates to a propeller system for aerial vehicles that reduces vibrations caused by difference in lift on the advancing blade and the retreating blade of the propeller system due to wind condition.

BACKGROUND

Background description includes information that may be useful in understanding the present disclosure. It is not an admission that any of the information provided herein is prior art or relevant to the presently claimed disclosure, or that any publication specifically or implicitly referenced is prior art.

Unmanned air vehicles (UAV), also known as drones, are vehicles that provide tremendous utility in numerous applications. One major application of drones is in the field of surveillance or mapping, where the drone is provided with a camera as payload. Under such applications, vibrations become a major hurdle for achieving the best video or photo Quality. Second major impact of vibration is on Autopilots. As drones are becoming popular and technology is advancing, autopilots are getting equipped with a lot of sensitive sensors like accelerometer and pressure sensors, and vibration is detrimental to their optimal performance as it results in noise in there reading.

One major source of vibrations in drones is propellers of the UAVs. In forward wind conditions, the propeller blades experience a difference in lift generated because of the difference in relative speed of the wind on the advancing blade and the retreating blade of the propeller, which acts as a force on the propeller and causes vibrations. As the size of the propeller gets bigger it gives advantages on endurance, but on the other hand, the problem of vibration becomes critical. Larger propellers rotate at lower RPM compared to the smaller propellers, which increases relative wind speed difference, resulting in an increase of in difference in the lift generated by the advancing blade and the retreating blade, leading to increase in vibrations.

Conventional method for to reduce the vibration from its origin, which is the propulsion system, the propeller is allowed to accommodate the lift deference by letting the propeller blades move, instead of passing that reaction to the whole body. For example, in a fully articulated helicopter rotor system, each rotor blade is attached to the rotor hub through a series of hinges that let the blade move independently of the others. Such rotor systems usually have three or more blades. The blades can flap, feather, and lead or lag independently of each other. A horizontal hinge, called the flapping hinge, allows the blade to move up and down, known in the art as flapping, and is designed to compensate for dissymmetry of lift. The flapping hinge works with external input which changes the pitch angle on each blade of the propeller. However, the arrangement makes whole assembly bulky and heavy, foreclosing any possibility of its implementation in drones.

Therefore, there is a requirement of an improved propeller system that overcomes the above stated drawbacks and helps in reduction in vibrations for improved.

SUMMARY

A general object of the present disclosure is to overcome drawbacks of the conventional propeller systems.

An object of the present disclosure is to provide a propeller system that causes reduced vibrations under forward wind conditions.

Another object of the present disclosure is to provide a propeller system that allows the propeller blades to flap under the forward wind condition, thereby reducing vibrations.

Yet another object of the present disclosure is to provide an efficient and cost-effective arrangement to mount propeller blades that allows the blades to flap.

Still another object of the present disclosure is to provide an arrangement to mount propeller blades for allowing the blades to flap that is simple and not bulky.

Yet still another object of the present disclosure is to provide an arrangement to mount propeller blades for allowing the blades to flap that can be implemented without major modifications.

The present disclosure relates to the field of aerial vehicles. In particular, the present disclosure relates to a propeller system for aerial vehicles that reduces vibrations caused by difference in lift on the advancing blade and the retreating blade of the propeller system due to wind condition.

In a first aspect, the present disclosure provides a propeller system including at least one resilient component configured with a mounting arrangement of a propeller of the propeller system. The resilient component is made of a resilient material that allows the propeller to tilt about a tethering axis under conditions of differential lift force on blades of the propeller under an advancing condition and a retreating condition.

In some embodiments, the propeller system includes a pair of resilient components, and the propeller is sandwiched between the resilient components, with the resilient components being in contact with two opposite mounting faces of the propeller.

In some embodiments, the at least one resilient component is a flat sheet made of silicon rubber.

In some embodiments, each of the resilient components includes a pair of cutouts positioned diametrically opposite to the rotational axis of the propeller system and configured to accommodate a pair of inserts, such that the inserts are in contact with the corresponding mounting face of the propeller to define the tethering axis of the propeller system.

In some embodiments, the inserts are of a rigid material.

In some embodiments, the inserts are made of any or a combination of a metal and a plastic.

In some embodiments, the inserts are positioned in the cutouts with a longitudinal axis of the inserts oriented in radial direction relative to the rotational axis of the propeller system. The orientation of the inserts in the radial direction results in a radial line contact between the propeller and the inserts to ensure that the tilting of the propeller is about the longitudinal axis of the inserts, the longitudinal axis of the inserts thereby defining the tethering axis of the propeller system.

In a second aspect, the present disclosure provides a propeller system including a propeller mount fixed to the propeller and a motor mount fixed to a motor of the propeller system. The propeller mount is pivotally coupled to the motor mount to define the tethering axis. The at least one resilient component is sandwiched between the propeller mount and the motor mount.

In some embodiments, the at least one resilient component is made of silicon rubber.

In some embodiments, the at least one resilient component is a pair of springs.

In some embodiments, the propeller includes two blades in diametrically opposite positions such that when one blade is in the advancing position the other blade is in the retreating position.

In some embodiments, the tethering axis is oriented at any non-perpendicular angle. In some embodiments, the non-perpendicular angle is about 45 degrees.

In some embodiments, the propeller system further includes a propeller mount including a protrusion, and a motor mount including a protrusion, such that, when the propeller mount protrusion is arranged atop the motor mount protrusion, the propeller mount and the motor mount fit.

In some embodiments, the motor mount protrusion and the propeller mount protrusion have a central hole, such that when the propeller mount and the motor mount fit, the central hole aligns. A central dowel is adapted to be inserted in the aligned hole to secure the propeller mount to the motor mount.

In some embodiments, the propeller system further includes a damper disposed between the propeller mount and the motor mount.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

Figure 1:
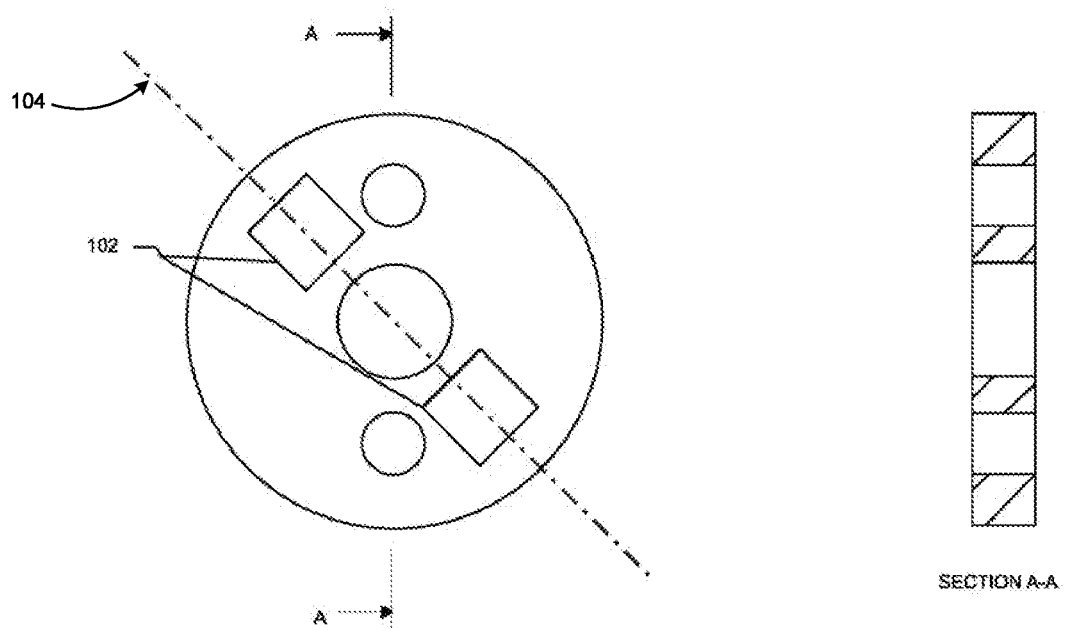
FIG. 1 illustrates schematic views of a resilient component used in a propeller system, according to an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments explained herein relate to a propeller system for applications such as UAVs/drones, where vibrations are detrimental to optimal performance during the assigned role, such as surveillance or mapping using a camera mounted on the vehicle. In particular, the disclosed propeller system reduces vibrations by allowing the blades to flap under conditions of differential lift force during advancing condition and retreating condition of the blade.

In particular, the mounting arrangement of the disclosed propeller system is configured to allow the blades to flap against the differential lift generated instead of transferring that force to the structure of the UAV. The resultant seesaw motion of the blades is designed in a way that Blade producing more lift tends to move up with pitching down and blade that produces less lift moves down with pitching up. As a result, pitch angle of the blade that moves up due to higher lift is reduced resulting in reduction in the lift, and on the opposite side pitch angle of the blade that moves down due to lower lift is increased resulting in increase in the lift. Thus, the propeller system attains an equilibrium and balance on its own.

Furthermore, the mounting arrangement of the disclosed propeller system also results in reduction in differential drag on the blades due to forward wind conditions. The blades experience difference in drag because of the difference in relative wind speed experienced by the advancing and retreating blades. The blade moving against wind speed experiences more wind speed and therefore experiences more drag, and blade moving in the direction of wind speed experiences less wind speed and therefore experiences less drag. The change of pitch angle for attaining lift equilibrium also helps to equalize the drag experienced by each blade. A blade with more drag moves up pitches down so it experiences less drag, and the blade experiencing less drag moves down with pitching up to increase in the drag which equalizes the drag experienced by the blades.

In a first aspect, the present disclosure provides a propeller system including at least one resilient component configured with a mounting arrangement of a propeller of the propeller system. The resilient component is made of a resilient material that allows the propeller to tilt about a tethering axis under conditions of differential lift force on blades of the propeller under an advancing condition and a retreating condition.

In some embodiments, the propeller system includes a pair of resilient components, and the propeller is sandwiched between the resilient components, with the resilient components being in contact with two opposite mounting faces of the propeller.

In some embodiments, the at least one resilient component is a flat sheet made of silicon rubber.

In some embodiments, each of the resilient components includes a pair of cutouts positioned diametrically opposite to the rotational axis of the propeller system and configured to accommodate a pair of inserts, such that the inserts are in contact with the corresponding mounting face of the propeller to define the tethering axis of the propeller system.

In some embodiments, the inserts are of a rigid material.

In some embodiments, the inserts are made of any or a combination of a metal and a plastic.

In some embodiments, the inserts are positioned in the cutouts with a longitudinal axis of the inserts oriented in radial direction relative to the rotational axis of the propeller system. The orientation of the inserts in the radial direction results in a radial line contact between the propeller and the inserts to ensure that the tilting of the propeller is about the longitudinal axis of the inserts, the longitudinal axis of the inserts thereby defining the tethering axis of the propeller system.

In some embodiments, the propeller system includes a propeller mount fixed to the propeller and a motor mount fixed to a motor of the propeller system. The propeller mount is pivotally coupled to the motor mount to define the tethering axis. The at least one resilient component is sandwiched between the propeller mount and the motor mount.

In some embodiments, the at least one resilient component is made of silicon rubber.

In some embodiments, the at least one resilient component is a pair of springs.

In some embodiments, the propeller includes two blades in diametrically opposite positions such that when one blade is in the advancing position the other blade is in the retreating position.

In some embodiments, the tethering axis is at 45 degrees to an axis of the two propeller blades of the propeller.

In some embodiments, the propeller system further includes a propeller mount including a protrusion, and a motor mount including a protrusion, such that, when the propeller mount protrusion is arranged atop the motor mount protrusion, the propeller mount and the motor mount fit.

In some embodiments, the motor mount protrusion and the propeller mount protrusion have a central hole, such that when the propeller mount and the motor mount fit, the central hole aligns. A central dowel is adapted to be inserted in the aligned hole to secure the propeller mount to the motor mount.

In some embodiments, the propeller system further includes a damper disposed between the propeller mount and the motor mount.

It is to be appreciated that the disclosed mounting system for propeller is designed to accommodate unibody propellers with 2 blades, i.e., the two blades are not independently fixed to the propeller mount, rather the two blades have a unibody.

In some embodiments, at least one resilient component is provided in the mounting arrangement of the propeller of the propeller system that allows the blades to flap.

In some embodiments, the propeller can be sandwiched between a pair of resilient components and the flapping axis (also referred to as tethering axis or tethering hinge, and all the terms used interchangeably hereinafter) is defined by the inserts made of a rigid material that are positioned in cutouts in the resilient component.

In some embodiments, the flapping axis of the propeller blades is defined by a propeller mount and a motor mount, fixed to the propeller and the motor respectively, and pivotally coupled to each other to define the flapping axis. At least one resilient component is positioned between the propeller mount and the motor mount for a controlled relative movement between the two about the flapping axis. The resilient component can be a sheet of silicon rubber or springs.

FIG. 1 illustrates schematic views of a resilient component 100 used in a propeller system 200, according to an embodiment of the present disclosure.

Figure 2:
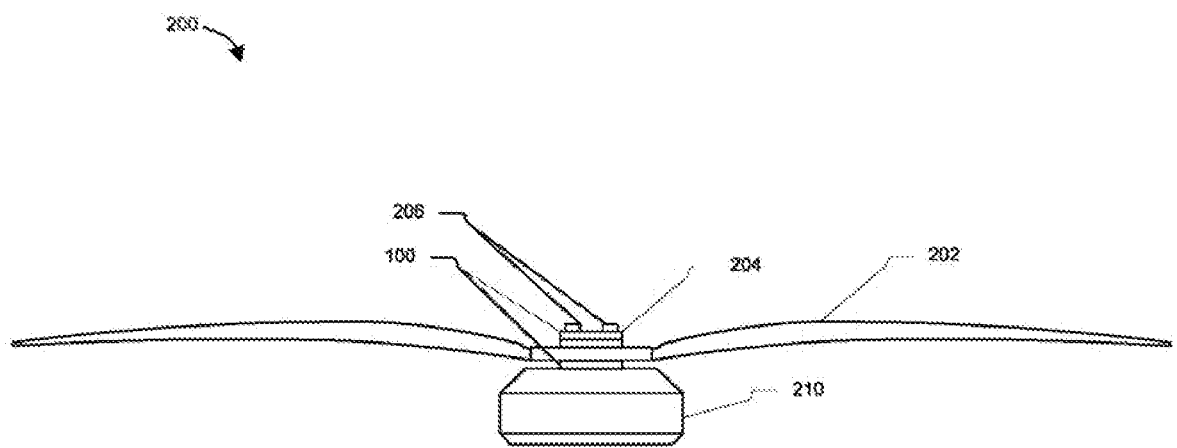
FIG. 2 illustrates a schematic front view of the propeller system fitted with the resilient component of FIG. 1, according to an embodiment of the present disclosure.
Figure 3:
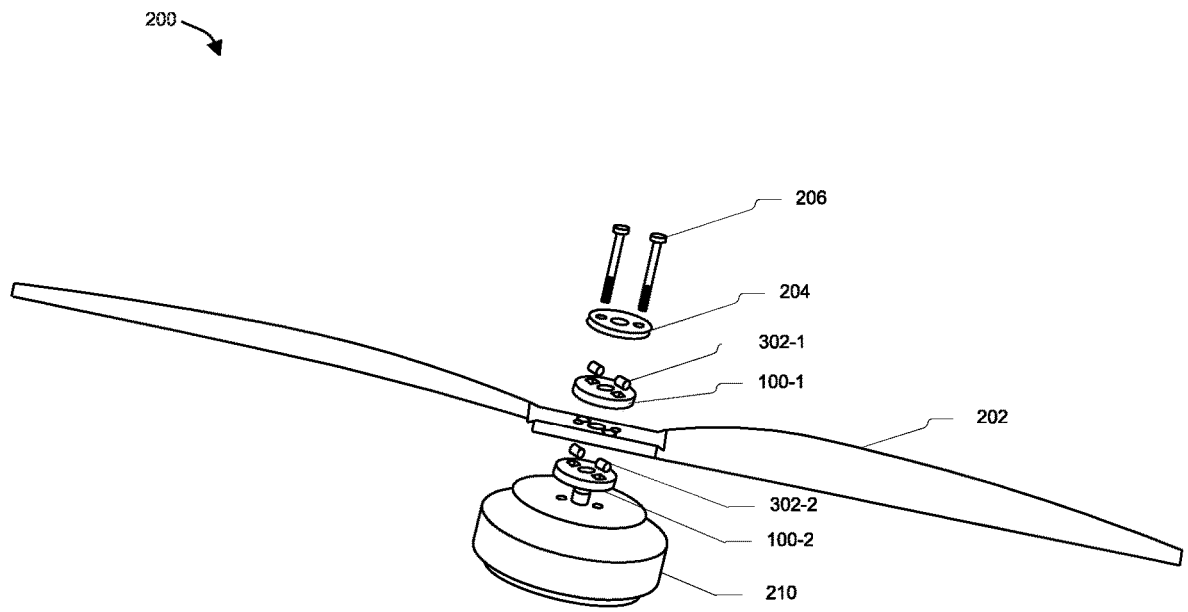
FIG. 3 illustrates a schematic exploded view of the propeller system, according to an embodiment of the present disclosure.

FIGS. 2 and 3 illustrate schematic front and exploded views, respectively, of the propeller system 200, according to an embodiment of the present disclosure.

Referring now to FIGS. 1 to 3, the propeller system 200 includes a pair of resilient components 100, one on each side of the propeller 202 such that the propeller 202 is sandwiched between the resilient components 100, with a washer 204 and a motor 210 being positioned on outer sides of the two resilient components 100 and fixed together by screws 206.

The resilient component 100 can be a flat component made of a resilient material, such as silicon rubber. In the illustrated embodiment of FIG. 1, the resilient component 100 has a disc shape. However, in some other embodiments, the resilient component 100 may have other shapes, such as, but not limited to, a polygonal shape. The resilient component 100 can include a pair of cutouts 102 positioned on diametrically opposite sides of a center of the resilient component 100. The center may coincide with a rotational axis of the propeller system 200. The cutouts 102 define the flapping axis 104 of the propeller system 200. The cutouts 102 can be of rectangular shape and can be configured to accommodate inserts 302-1 and 302-2 (collectively and individually referred to as insert(s) 302), as shown in FIG. 3. The inserts may be made of a rigid material, such as, but not limited to, any or a combination of a metal and a plastic. The cutouts 102 and the inserts 302 can be configured, such that the inserts 302 are in contact with a corresponding mounting face of the propeller 202. The inserts may be positioned in the cutouts 102 with a longitudinal axis of the inserts 302 oriented in a radial direction relative to the rotational axis of the propeller system 200. The orientation of the inserts 302 in the radial direction results in a radial line contact between the propeller 202 and the inserts 302 to ensure that the tilting of the propeller 202 is about the longitudinal axis of the inserts 302. Thus, the longitudinal axis of the inserts 302 defines the tethering axis of the propeller system 200.

Figure 4:
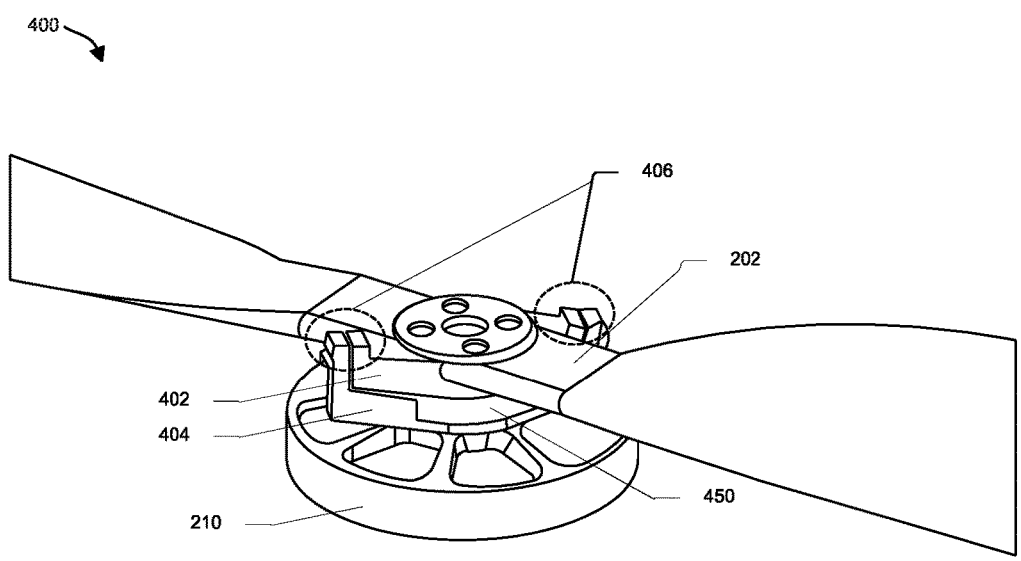
FIG. 4 illustrates a schematic perspective view of the propeller system, according to another embodiment of the present disclosure.
Figure 5:
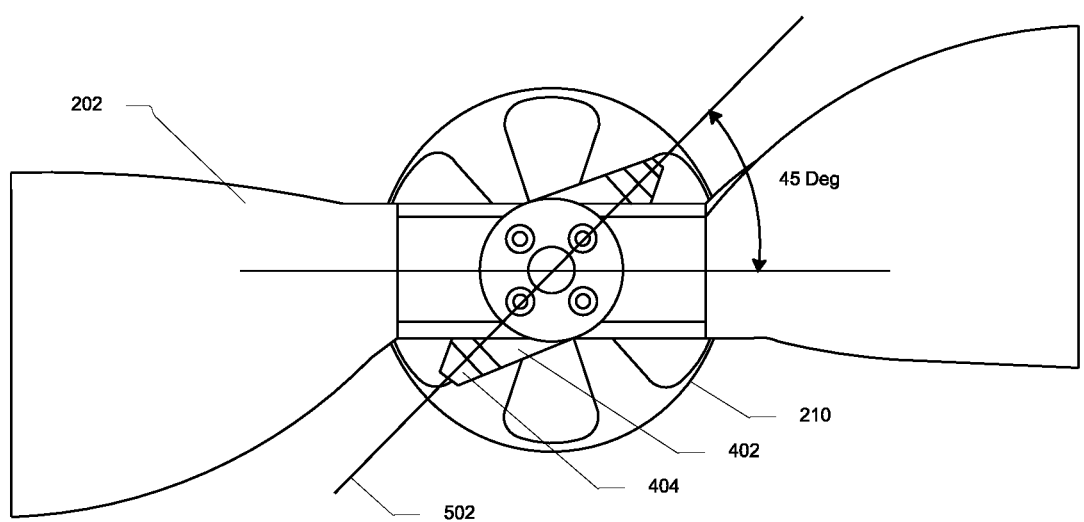
FIG. 5 illustrates a schematic top view of the propeller system of FIG. 4, according to an embodiment of the present disclosure.

FIGS. 4 and 5 illustrate schematic perspective and top views of a propeller system 400, according to another embodiment of the present disclosure. The propellor system 400 is substantially similar to the propellor system 200, and common components between the propellor system 200 and the propellor system 400 are referenced using the same reference numerals. The propellor system 400 is based on a combination of a propeller mount 402 fixed to the propeller 202 and a motor mount 404 fixed to the motor 210 of the propeller system 400. The propeller mount 402 may be pivotally coupled to the motor mount 404 through screws 406. The pivotal coupling of the propeller mount 402 to the motor mount 404 defines the pivotal axis 502 (shown in FIG. 5), which works as the tethering axis. There can be a single flat resilient component 450, such as made of silicon rubber, sandwiched between the propeller mount 402 and the motor mount 404. Alternatively, the resilient component can be a set of springs between the propeller mount 402 and the motor mount 404.

In application, the tethering axis may be oriented at any non-perpendicular angle. In some embodiments, the non-perpendicular angle may be about 45 degrees.

Figure 6:
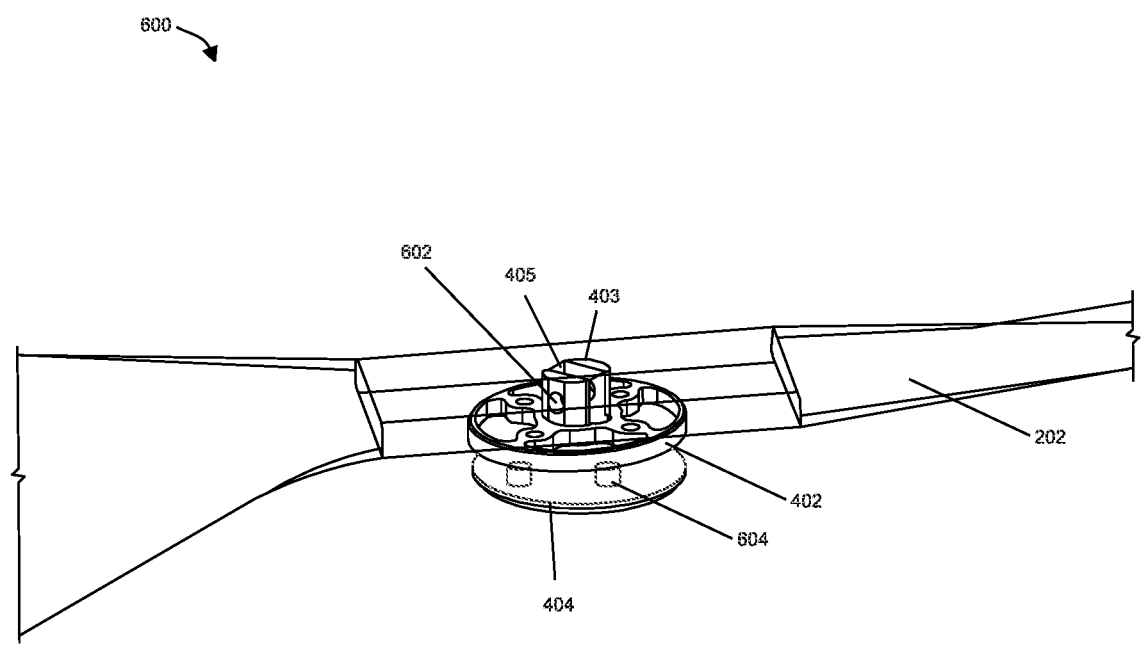
FIG. 6 illustrates a schematic perspective view of the propeller system, according to another embodiment of the present disclosure.
Figure 7:
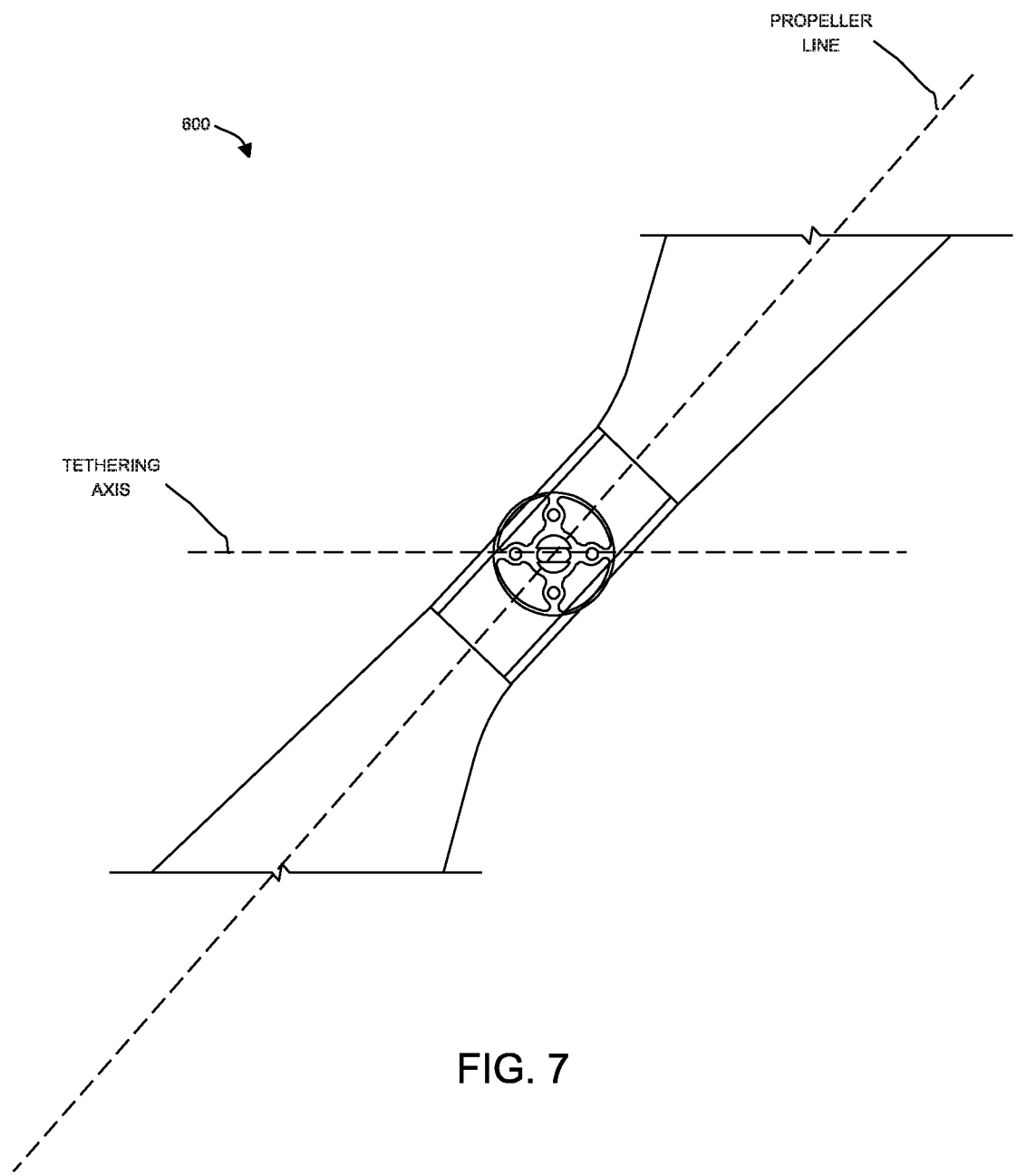
FIG. 7 illustrates a schematic top view of the propeller system of FIG. 6, according to an embodiment of the present disclosure.

FIGS. 6 and 7 illustrate schematic perspective and top views of a propeller system 600, according to another embodiment of the present disclosure. The propellor system 600 is substantially similar to the propellor system 400, and common components between the propellor system 200 and the propellor system 400 are referenced using the same reference numerals. The motor mount 404 has a central protrusion 405 and the propeller mount 402 has a protrusion part 403 to accommodate the motor mount protrusion 405, such that, when the propeller mount 402 is fixed atop of the motor mount 404 they both fit together. The protrusions 403, 405 of both the motor mount 404 and the propeller mount 402 has holes in them in order to fit a central dowel 602 in it. The central dowel 602, when fit into the hole of the motor mount 404 and propeller mount 402, forms the tethering axis for the propeller 202 as this entire protrusion gets fit in the central part of the propeller 202 and the propeller 202 gets fixed over the propeller mount 402 with this protrusion mechanism in its center with screws. A damper 604 is provided in between the propeller mount 402 and the motor mount 404.

Thus, the present disclosure provides a simple, easy to implement and cost-effective propeller system that allows the propeller blades to flap, thereby reducing vibrations.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions or examples, which are included to enable a person having ordinary skill in the art to make and use the disclosure when combined with information and knowledge available to the person having ordinary skill in the art.

ADVANTAGES OF THE DISCLOSURE

The present disclosure overcomes drawbacks of the conventional propeller systems.

The present disclosure provides a propeller system that causes reduced vibrations under forward wind conditions.

The present disclosure provides a propeller system that allows the propeller blades to flap under the forward wind condition, thereby reducing vibrations.

The present disclosure provides an efficient and cost-effective arrangement to mount propeller blades that allows the blades to flap.

The present disclosure provides an arrangement to mount propeller blades for allowing the blades to flap that is simple and not bulky.

The present disclosure provides an arrangement to mount propeller blades for allowing the blades to flap that can be implemented without major modifications.

What is claimed is:

1. A propeller system comprising a pair of resilient components configured with a mounting arrangement of a propeller of the propeller system, wherein each resilient component is made of a resilient material that allows the propeller to tilt about a tethering axis under conditions of differential lift force on blades of the propeller under an advancing condition and a retreating condition,
    wherein the propeller is sandwiched between the pair of resilient components, with each of the resilient components being in contact with two opposite mounting faces of the propeller, and
    wherein each resilient component includes a pair of cutouts positioned diametrically opposite to a rotational axis of the propeller system and each cutout accommodates an insert such that each of the inserts is in contact with the corresponding mounting face of the propeller to define the tethering axis of the propeller system.

2. The propeller system as claimed in claim 1, wherein each resilient component is a flat sheet made of silicon rubber.

3. The propeller system as claimed in claim 1, wherein the inserts are of a rigid material.

4. The propeller system as claimed in claim 1, wherein the inserts are made of a metal, or a plastic, or a combination thereof.

5. The propeller system as claimed in claim 1, wherein the inserts are positioned in the pair of cutouts with a longitudinal axis of the inserts oriented in radial direction relative to the rotational axis of the propeller system, and wherein the orientation of the inserts in the radial direction results in a radial line of contact between the propeller and the inserts to ensure that the tilting of the propeller is about the longitudinal axis of the inserts, the longitudinal axis of the inserts thereby defining the tethering axis of the propeller system.

* * * * *